United States Patent Office 3,781,269
Patented Dec. 25, 1973

1

3,781,269
2,3-ALKYLIDENE-RHAMNOPYRANOSIDES AND
PROCESS FOR PREPARING THEM
Werner Haede and Ulrich Stache, Hofheim, Taunus,
Werner Fritsch, Neuenhain, Taunus, Kurt Radscheit,
Kelkheim, Taunus, and Ernst Lindner, Frankfurt am
Main, Germany, assignors to Farbwerke Hoechst Aktiengesellschaft vormals Meister Lucius & Bruning,
Frankfurt am Main, Germany
No Drawing. Filed Apr. 29, 1971, Ser. No. 138,762
Claims priority, application Germany, May 2, 1970,
P 20 21 557.0
Int. Cl. C07c 173/00
U.S. Cl. 260—210.5       4 Claims

ABSTRACT OF THE DISCLOSURE

Rhamnopyranosides substituted by alkylidene, cyclohexylidene and tetrahydropyranylidene are disclosed as being effective therapeutic agents against cardiac insufficiency.

---

Cardiac glycosides which are derived from strophanthidin are generally distinguished by a strong positively inotropic action when administered intravenously. When administered via the gastro-intestinal tract, this action is strongly reduced. For example, with strophanthin, the resorption is about 3% only.

The present invention relates to rhamnopyranosides of the general Formula I

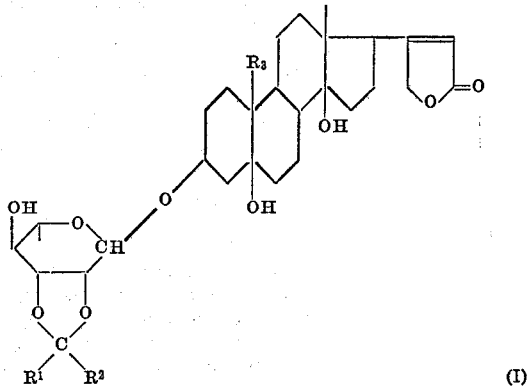

in which $R^1$ and $R^2$ represent lower alkyl groups which may also be closed to form a homocyclic or heterocyclic ring, and $R_3$ represents CHO or $CH_2OH$.

The invention furthermore provides a process for preparing the compounds of the above specified Formula I, which comprises reacting convallatoxin with ketals of the general Formula II

in which $R^1$ and $R^2$ have the meanings given above and $R^4$ stands for a lower alkyl group, in the presence of acid catalysts and, if desired, reducing the aldehyde group $R^3$ to form the $CH_2OH$ group.

As ketals, the dimethyl or diethyl ketals of lower aliphatic and cycloaliphatic ketones or of tetrahydro-γ-pyrone may be used, for example acetone-dimethyl ketal, acetone-diethyl ketal, methylethyl-ketone-dimethyl ketal, cyclohexanone-diethyl ketal and 4,4 - dimethoxy-tetrahydropyrane. As acid catalysts, mineral acids in low concentrations, for example hydrochloric acid, methane-sulfonic acid, p-toluene-sulfonic acid or boron-trifluoride etherate are suitable.

It is advantageous to add to the reaction mixture the ketone on which the ketal is based. The reaction is suitably carried out in a suitable solvent such as tetrahydrofurane or dioxane. The reaction can be carried out at temperatures in the range of from 0° C. and the boiling temperature of the solvent used, suitably at room temperature. The completion of the reaction is determined best by thin-layer chromatography. Depending on the conditions used, the reaction time ranges from some minutes to several hours. The reduction of the aldehyde group to the alcohol group which may be carried out subsequently, can be effected in the usual manner, for example by means of sodium boron hydride or lithium-tritert.butoxy-aluminium hydride.

The compounds of the present invention possess valuable pharmacological properties. They have been tested according to the atrium test or the potassium excretion on an isolated heart of a guinea pig. In these animal tests, the ketals of the invention showed a positively inotropic action, with a strongly increased resorption, as compared to that of the starting glycoside. Furthermore, it was found that pharmacologically important parameters such as the duration of action, the rate of resorption and the accumulation were favourably influenced. The compounds of the invention also have a better lipid solubility than the starting substances.

The new compounds are valuable therapeutic agents against cardiac insufficiency. The single dose for humans is in the range of between 0.1 and 1 mg. per dosage unit. The new compounds are preponderantly administered perorally, in the form of tablets, capsules, dragées, for the preparation of which the usual pharmaceutical adjuvants and excipients may be used, for example starch, lactose, tragacanth, magnesium stearate and talc. For intravenous injections, the compounds may be administered in the form of solutions in water or physiological salt solution.

The following examples illustrate the invention:

EXAMPLE 1

2′,3′-isopropylidene-convallatoxin 500 mg. of convallatoxin and 25 mg. of p-toluene-sulfonic acid were stirred for 90 minutes at room temperature in 5 cc. of dioxane and 5 cc. of acetone. Then, 0.05 cc. of pyridine were added and the reaction mixture was evaporated to dryness in a rotatory evaporator at room temperature and under reduced pressure. The residue was combined with 0.05 cc. of pyridine and dissolved in 2.5 cc. of acetone. 5 cc. of H₂O were added and the solution was concentrated to ≈2 cc. (in a rotatory evaporator). Thereupon, the acetonide precipitated. Yield: 405 mg. The substance was found to be, according to the thin-layer chromatogram, uniform and had a melting point, after recrystallization from ethyl acetate, of 175–180° C. (formation of foam).

EXAMPLE 2

2',3'-cyclohexylidene-convallatoxin 100 mg. of convallatoxin were stirred for 4 hours at room temperature with 0.2 cc. of cyclohexanone-diethyl ketal and 10 mg. of p-toluene-sulfonic acid in 2 cc. of dioxane and 1 cc. of cyclohexanone. Working up was effected as described in Example 1. The crude product was dissolved in methylene chloride and precipitated with di-isopropyl ether. Yield: 70 mg.; melting point: 175–180° C. (thin-layer chromatogram: uniform).

EXAMPLE 3

2',3'-(tetrahydro-γ-pyranylidene)-convallatoxin 200 mg. convallatoxin were stirred for 2 hours at room temperature with 0.5 cc. of 4,4-dimethyloxytetrahydro-pyrane and 20 mg. of p-toluene-sulfonic acid. Then, 0.15 cc. of 4,4-dimethoxytetrahydropyrane were added. Working up was carried out after 2 hours as indicated in Example 1. The crude product was dissolved in 2.5 cc. of methylene chloride and after addition of 5 cc. of di-isopropyl ether, the solution was concentrated in a rotatory evaporator to about 2 cc. Yield: 130 mg.; melting point 140–147° C. (amorphous).

We claim:
1. Rhamnopyranosides of the formula

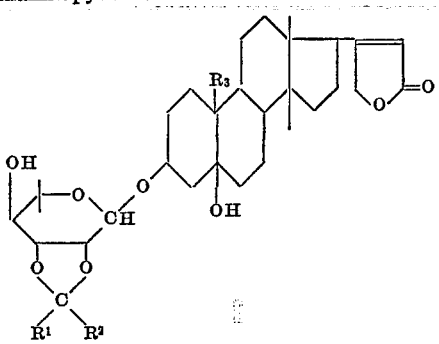

in which $R^1$ and $R^2$ represent lower alkyl or, together with the carbon to which they are attached, cyclohexylidene or tetrahydro-β-pyranylidene, and $R^3$ represents CHO or $CH_2OH$.
2. 2',3'-isopropylidene-convallatoxin.
3. 2',3'-cyclohexylidene-convallatoxin.
4. 2',3'-(tetrahydro-γ-pyranylidene)-convallatoxin.

References Cited

UNITED STATES PATENTS

| | | | |
|---|---|---|---|
| 3,211,719 | 10/1965 | Von Wartberg et al. | 260—210.5 |
| 3,471,470 | 10/1969 | Heider et al. | 260—210.5 |
| 3,476,742 | 11/1969 | Voigtlander et al. | 260—210.5 |

JOHNNIE R. BROWN, Primary Examiner

U.S. Cl. X.R.

424—182